US010741875B2

(12) United States Patent
Kwon et al.

(10) Patent No.: US 10,741,875 B2
(45) Date of Patent: Aug. 11, 2020

(54) BATTERY ANODE FOR AN ALL SOLID CELL

(71) Applicants: Hyundai Motor Company, Seoul (KR); Kia Motors Corporation, Seoul (KR); IUCF-HYU (Industry-University Cooperation Foundation Hanyang University), Seoul (KR)

(72) Inventors: Oh Min Kwon, Busan (KR); Yong Sub Yoon, Seoul (KR); Sung Woo Noh, Seoul (KR); Sun Ho Choi, Incheon (KR); Moon Ju Cho, Seoul (KR); Dong Wook Shin, Gyeonggi-do (KR); Chan Hwi Park, Seoul (KR)

(73) Assignees: Hyundai Motor Company, Seoul (KR); Kia Motors Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 85 days.

(21) Appl. No.: 15/845,175

(22) Filed: Dec. 18, 2017

(65) Prior Publication Data

US 2019/0115618 A1    Apr. 18, 2019

(30) Foreign Application Priority Data

Oct. 13, 2017  (KR) .......................... 10-2017-0133338

(51) Int. Cl.
*H01M 10/0525* (2010.01)
*H01M 10/0565* (2010.01)
(Continued)

(52) U.S. Cl.
CPC ..... *H01M 10/0525* (2013.01); *H01M 2/1646* (2013.01); *H01M 4/04* (2013.01);
(Continued)

(58) Field of Classification Search
CPC .......... H01M 10/0525; H01M 2/1646; H01M 10/0585; H01M 4/04; H01M 10/0565; H01M 4/1391; H01M 4/52
(Continued)

(56) References Cited

U.S. PATENT DOCUMENTS

2013/0224632 A1* 8/2013 Roumi ................ H01M 2/166
429/516
2014/0302229 A1* 10/2014 Miki ...................... H01M 4/62
427/58
2017/0294687 A1* 10/2017 Burshtain ......... H01M 10/0525

FOREIGN PATENT DOCUMENTS

JP            4827222 B2    11/2011
JP         2013-134825 A     7/2013
(Continued)

*Primary Examiner* — Gary D Harris
(74) *Attorney, Agent, or Firm* — Mintz Levin Cohn Ferris Glovsky and Popeo, P.C.; Peter F. Corless

(57) ABSTRACT

Provided are an anode for an all solid cell and a method of fabricating the same. The anode may include an anode current collector, a conductive material of which one end contacts a part of the anode current collector, a conductive coating layer surrounding the conductive material, an anode active material which contacts the other end of the conductive material, and a solid electrolyte. The conductive coating layer may prevent the conductive material and the solid electrolyte from being electrically connected to each other.

5 Claims, 9 Drawing Sheets

(51) Int. Cl.
  *H01M 4/52* (2010.01)
  *H01M 4/04* (2006.01)
  *H01M 4/1391* (2010.01)
  *H01M 10/0585* (2010.01)
  *H01M 2/16* (2006.01)

(52) U.S. Cl.
  CPC ........... *H01M 4/1391* (2013.01); *H01M 4/52* (2013.01); *H01M 10/0565* (2013.01); *H01M 10/0585* (2013.01)

(58) Field of Classification Search
  USPC ........................................................ 429/479
  See application file for complete search history.

(56) References Cited

FOREIGN PATENT DOCUMENTS

| | | |
|---|---|---|
| KR | 2013-0067139 A | 6/2013 |
| KR | 2015-0018562 A | 2/2015 |
| KR | 2016-0070931 A | 6/2016 |

* cited by examiner

BATTERY ANODE FOR AN ALL SOLID CELL

CROSS-REFERENCE TO RELATED APPLICATION

This application claims under 35 U.S.C. § 119(a) the benefit of Korean Patent Application No. 10-2017-0133338 filed Oct. 13, 2017, the entire contents of which are incorporated herein by reference.

TECHNICAL FIELD

The present inventions relates to an anode for an all solid cell and a fabrication method of the same. The anode for an all solid cell may be capable of suppressing generation of lithium in the anode by preventing direct electrical contact between a conductive material and a solid electrolyte which are included in the anode for the all solid cell.

BACKGROUND

Materials having a lower voltage range than lithium have been used for an anode of a lithium secondary cell. Accordingly, a potential change inside an electrode may be often unbalanced, for example, when a graphite-based material having a low potential is used as the conductive material, the potential to lithium is frequently moved to near 0 V. At this time, lithium may be precipitated on the surface of graphite, and as a result, the performance of the cell may be deteriorated.

The all solid cell has the high content of the conductive material due to a complex electrode structure in which an anode active material, a solid electrolyte, and a conductive material are mixed together. The nonuniformity of voltages often occurs due to the heterogeneous mixing of the electrodes compared to a liquid-based cell constituted by only the active material and the conductive material. In addition, since the conductive material directly contacts the solid electrolyte containing a lot of lithium ions, lithium may be precipitated on the surface of the conductive material having a potential close to 0 V. The precipitated lithium may cause an interfacial reaction with the solid electrolyte to degenerate the solid electrolyte or deteriorate the performance of the cell through dendrite growth.

In the related art, a configuration in which a conductive material and a coating layer are formed on the surface of an electrode active material has been disclosed, however, the process may be complicated.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, the present invention may provide an anode for an all solid cell and the anode may be capable of suppressing generation of lithium in the anode by preventing direct electrical contact between a conductive material and a solid electrolyte.

The term "all solid cell" as described herein refers to a cell or a battery that includes only solid or substantially solid-state components, such as solid state electrodes (e.g. anode and cathode) and solid electrolyte. Thus, in preferred aspect, an all-solid cell will not include a fluid and/or flowable electrolyte component as material.

Further, the present invention may provide a method of fabricating an anode for an all solid cell.

In one aspect, provided is an anode for an all solid cell. The anode may include: an anode current collector, a conductive material of which one end contacts a part of the anode current collector, a conductive coating layer surrounding the conductive material, an anode active material which contacts the other end of the conductive material; and a solid electrolyte. Preferably, the conductive coating layer may, at least substantially, prevent the conductive material and the solid electrolyte from being electrically connected to each other. The conductive coating layer may include one or more nonconductive oxides. In particular aspects, the conductive coating layer may suitably include at least one of $P_2O_5$, $B_2O_3$, and $SiO_2$.

Preferably, the conductive material may be a carbon compound having a needle-like shape and include a long axis and a short axis on a cross section. The conductive material may suitably contact the anode current collector at one end of the long axis and contact the anode active material at the other end of the long axis.

The term "needle-like" as used herein refers to a shape having a needle shape or approximately needle shape that has a length (or, long axis) greater than a cross section area of across the length direction (or, short axis). For example, the length of the needle shape or the long axis is greater than about 10 times, 20 times, 30 times, 40 times, 50 times, or 100 times greater than the cross section area or the short axis.

In another aspect, provided is a method of fabricating an anode for an all solid cell. The method may include: providing a conductive material; forming a conductive coating layer on the conductive material by heat-treating at a temperature of about 300 to 700° C.; providing an anode current collector of which one part contacts one end of the conductive material; providing an anode active material to contact the other end of the conductive material; and providing a solid electrolyte which may be electrically separated from the conductive material by the conductive coating layer.

The conductive coating layer may suitably include one or more nonconductive oxides. The conductive coating layer may suitably include at least one coating material that includes $P_2O_5$, $B_2O_3$, and/or $SiO_2$. Preferably, the conductive coating layer may include an amount of about 1 to 3 wt % of a coating material based on the conductive material.

According to the anode for the all solid cell according to the embodiment of the present invention, it is possible to suppress generation of lithium in the anode by preventing direct electrical contact between the conductive material and the solid electrolyte. Accordingly, it is possible to increase the charge/discharge capacity of the all solid cell and increase the lifespan of the all solid cell.

Also provided is an all-solid cell that may include the anode as described herein.

Still further provided is a vehicle that includes an all-solid cell or anode as described herein.

According to the exemplary methods of fabricating the anode for the all solid cell according to the embodiment of the present invention, it is possible to provide an anode for the all solid cell capable of suppressing generation of lithium in the anode by preventing direct electrical contact between the conductive material and the solid electrolyte. As such, charge/discharge capacity of the all solid cell may be increased and lifespan of the all solid cell may be increased.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
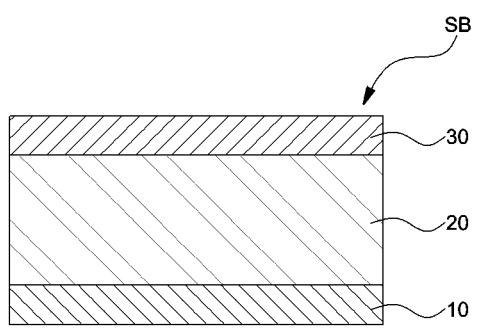
FIG. 1 is a schematic cross-sectional view of an exemplary all solid cell according to an exemplary embodiment of the present invention.

Reference numerals set forth in the Drawings includes reference to the following elements as further discussed below:

| | |
|---|---|
| SB: All solid cell | 10: Cathode |
| 20: Solid electrolyte layer | 30: Anode |
| 100: Anode current collector | 200: Conductive material |
| 300: Conductive coating layer | 400: Anode active material |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The above objects, other objects, features, and advantages of the present invention will be easily understood through the following preferred embodiments with reference to the accompanying drawings. The present invention is not limited to the embodiments described therein and may also be modified in various different ways. On the contrary, embodiments introduced herein are provided to make disclosed contents thorough and complete and sufficiently transfer the spirit of the present invention to those skilled in the art.

In the description of each drawing, like reference numerals are used for like components. In the accompanying drawings, dimensions of structures are illustrated to be more enlarged than actual dimensions for clarity of the present invention. Terms such as first, second, and the like may be used to describe various components and the components should not be limited by the terms. The terms are used to only distinguish one component from another component. For example, a first component may be referred to as a second component, and similarly, the second component may be referred to as the first component without departing from the scope of the present invention. Singular expressions used herein include plurals expressions unless they have definitely opposite meanings in this context.

In the present application, it should be understood that the term "include" or "have"indicates that a feature, a number, a step, an operation, a component, a part or the combination thereof described in the specification is present, but does not exclude a possibility of presence or addition of one or more other features, numbers, steps, operations, components, parts or combinations thereof, in advance. It will be understood that when an element such as a layer, film, region, or substrate is referred to as being "on" another element, it can be directly on the other element or intervening elements may also be present. On the contrary, it will be understood that when an element such as a layer, film, region, or substrate is referred to as being "below" another element, it can be directly below the other element or intervening elements may also be present.

FIG. 1 is a schematic cross-sectional view of an exemplary all solid cell according to an exemplary embodiment of the present invention.

As shown in FIG. 1, an all solid cell SB according to an exemplary embodiment of the present invention may include a cathode 10, a solid electrolyte layer 20, and an anode 30. The cathode 10 may include a cathode active material. The cathode active material may include, for example, at least one of lithium cobalt oxide, lithium iron phosphate, nickel cobalt aluminum, and nickel cobalt manganese. The cathode 10 may include a cathode current collector. The cathode 10 may also include a solid electrolyte layer.

The solid electrolyte layer 20 is provided between the cathode 10 and the anode 30. The solid electrolyte layer 20 may include, for example, a sulfide-based solid electrolyte. The sulfide-based solid electrolyte may refer to a solid electrolyte including sulfide.

The anode 30 faces the cathode 10. The anode 30 will be described below in more detail.

Figure 2:
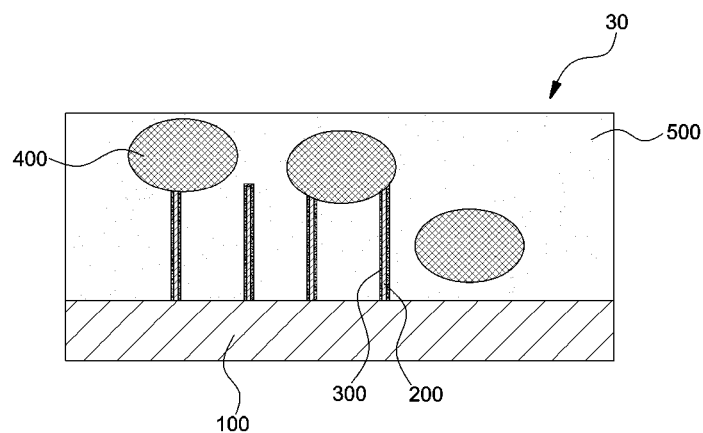
FIG. 2 is a cross-sectional view schematically illustrating an exemplary anode included in an exemplary all solid cell according to an exemplary embodiment of the present invention.

FIG. 2 is a cross-sectional view schematically illustrating an exemplary anode included in an exemplary all solid cell according to an exemplary embodiment of the present invention.

As shown in FIG. 2, the anode 30 may include an anode current collector 100, a conductive material 200, a conductive coating layer 300, an anode active material 400, and a solid electrolyte 500. The anode current collector 100 may include at least one of, for example, copper, nickel, and steel use stainless (SUS). Preferably, a part of the anode current collector 100 may contact one end of the conductive material 200.

One end of the conductive material 200 may contact a part of the anode current collector 100. The other end of the conductive material 200 may contact the anode active material 400. The conductive coating layer 300 may surround the conductive material 200. The conductive coating layer 300 may suitably include one or more nonconductive oxides to prevent direct electrical contact between the conductive material 200 and the solid electrolyte 500 (FIG. 2). The conductive coating layer 300 may suitably include at least one coating material of, for example, $P_2O_5$, $B_2O_3$, and $SiO_2$. The conductive material 200 and the conductive coating layer 300 will be described below in more detail.

The anode active material 400 may be selected from the group consisting of, for example, graphite, silicon, tin, indium, lithium, and combinations thereof. A part of the anode active material 400 contacts the conductive material 200.

The solid electrolyte 500 may be, for example, a sulfide-based solid electrolyte such as $Li_7P_3S_{11}$, $Li_6PS_5Cl$, and $Li_{10}GeP_2S_{12}$ or an oxide-based solid electrolyte such as $Li_7La_3Zr_2O_{12}$. The solid electrolyte 500 may be electrically separated from the conductive material 200 by the conductive coating layer 300.

Figure 3A:
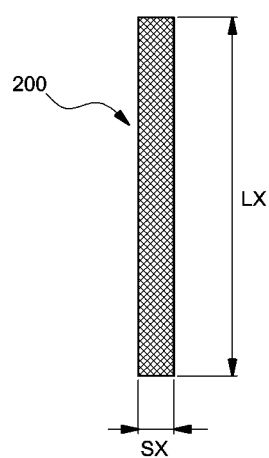
FIG. 3A is a schematic cross-sectional view of an exemplary conductive material included in an exemplary anode for an exemplary all solid cell according to an exemplary embodiment of the present invention.
Figure 3B:
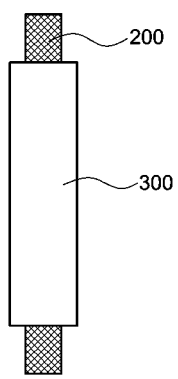
FIG. 3B is a cross-sectional view schematically illustrating that an exemplary conductive coating layer is supplied to an exemplary conductive material included in an exemplary anode for an exemplary all solid cell according to an exemplary embodiment of the present invention.

FIG. 3A is a schematic cross-sectional view of an exemplary conductive material included in an exemplary anode for an exemplary all solid cell according to an exemplary embodiment of the present invention. FIG. 3B is a cross-sectional view schematically illustrating that an exemplary conductive coating layer is supplied to an exemplary conductive material included in an exemplary anode for an exemplary all solid cell according to an exemplary embodiment of the present invention.

As shown in FIGS. 3A and 3B, the conductive material 200 may have a needle-like shape. The conductive material 200 may be, for example, a carbon compound. The carbon compound may suitably include both a carbon body made of carbon itself and a substance containing carbon. The conductive material 200 may include a long axis LX and a short axis SX on a cross section. As shown in FIGS. 2, 3A and 3B, the conductive material 200 may contact the anode current collector 100 at one end of the long axis LX and may contact the anode active material 400 at the other end of the long axis LX.

The conductive coating layer 300 may surround a part of the conductive material 200. FIG. 3B illustrates an example in which the conductive coating layer 300 surrounds the conductive material 200, and when the conductive coating layer 300 prevents the direct electrical contact between the conductive material 200 and the solid electrolyte 500 (FIG. 2), the conductive coating layer 300 may surround the conductive material 200 greater than that in FIG. 3B and surround the conductive material 200 less than that in FIG. 3B.

The anode for the all solid cell in the related art does not include the conductive coating layer surrounding the conductive material, and as a result, the conductive material and the solid electrolyte which are included in the anode directly make electrical contact to precipitate lithium. The precipitated lithium may be directly contacted with the solid electrolyte to degenerate the solid electrolyte and form a dendrite, thereby deteriorating the charge/discharge capacity of the all solid cell and shortening the lifespan of the all solid cell.

However, the anode for the all solid cell according to an exemplary embodiment of the present invention may include the conductive coating layer, thereby suppressing generation of lithium in the anode by preventing direct electrical contact between the conductive material and the solid electrolyte. As a result, the charge/discharge capacity of the all solid cell may be increased and the lifespan of the all solid cell may be increased.

Hereinafter, an exemplary fabrication method of an exemplary anode for an exemplary all solid cell according to an exemplary embodiment of the present invention will be described. Hereinafter, differences from the anode for the all solid cell according to the exemplary embodiments of the present invention described above will be mainly described in detail, and unexplained parts follow the description of an exemplary anode for an exemplary all solid cell according to an exemplary embodiment of the present invention described above.

Figure 4:
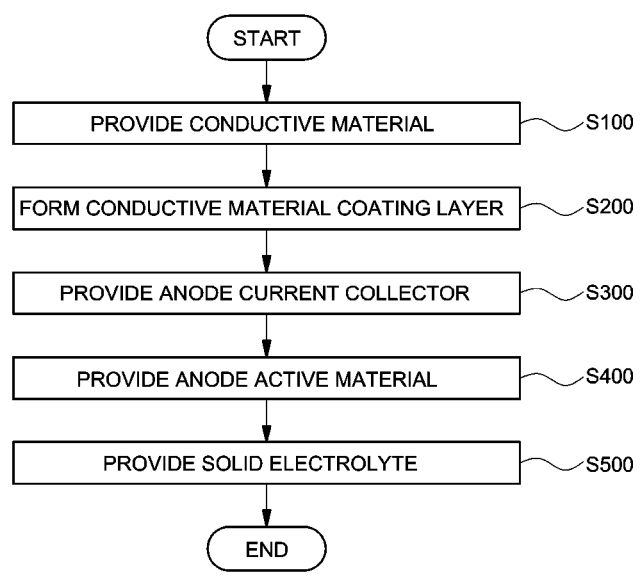
FIG. 4 is a flowchart schematically illustrating an exemplary method of fabricating an exemplary anode for an exemplary all solid cell according to an exemplary embodiment of the present invention.

FIG. 4 is a flowchart schematically illustrating an exemplary fabrication method of an exemplary anode for an exemplary all solid cell according to an exemplary embodiment of the present invention.

As shown in FIGS. 2 and 4, a fabrication method of the anode 30 for the all solid cell according to an exemplary embodiment of the present invention may include providing the conductive material 200 (S100), forming the conductive coating layer 300 on the conductive material 200 by heat-treating at a temperature of about 300 to 700° C. (S200), providing the anode current collector 100 of which one part contacts one end of the conductive material 200 (S300), providing the anode active material 400 to contact the other end of the conductive material 200 (S400), and providing the solid electrolyte 500 which may be electrically separated from the conductive material 200 by the conductive coating layer 300 (S500).

First, the conductive material 200 maybe provided (S100). The conductive material 200 may have a needle-like shape. The conductive material 200 may be, for example, a carbon compound.

The conductive coating layer 300 may be formed on the conductive material 200 by heat-treating at a temperature of about 300 to 700° C. (S200). When the heat treatment temperature deviates from the range, the capacity value of the all solid cell may be decreased. This will be described in more detail in Examples. In the forming of the conductive coating layer 300 (S200), the conductive coating layer 300 may be formed by providing a nonconductive oxide as a coating material. In the forming of the conductive coating layer 300 (S200), the conductive coating layer 300 may be formed by providing at least one coating material of, for example, $P_2O_5$, $B_2O_3$, and $SiO_2$.

In the forming of the conductive coating layer 300 (S200), the conductive coating layer 300 may be formed by providing an amount of about 1 to 3 wt % of a coating material based on the conductive material 200. When the coating material is used as deviated from the predetermined range, t the capacity value of the all solid cell may be decreased. This will be described in more detail in Examples.

Next, the anode current collector 100 may be provided (S300). The anode current collector 100 may include at least one of, for example, copper, nickel, and steel use stainless (SUS). A part of the anode current collector 100 may contact one end of the conductive material 200.

Next, the anode active material 400 may be provided (S400). The anode active material 400 may be provided before the anode current collector 100. The anode active material 400 may be selected from the group consisting of, for example, graphite, silicon, tin, indium, lithium, and combinations thereof. A part of the anode active material 400 may contact the conductive material 200.

Next, the solid electrolyte 500 may be provided (S500). The solid electrolyte 500 may be, for example, a sulfide-based solid electrolyte such as $Li_7P_3S_{11}$, $Li_6PS_5Cl$, and $Li_{10}GeP_2S_{12}$ or an oxide-based solid electrolyte such as $Li_7La_3Zr_2O_{12}$. The solid electrolyte 500 may be electrically separated from the conductive material 200 by the conductive coating layer 300.

The anode for the all solid cell fabricated by the fabrication method of the anode for the all solid cell in the related art does not include the conductive coating layer surrounding the conductive material, and as a result, the conductive material and the solid electrolyte which are included in the anode directly make electrical contact so as to precipitate lithium. The precipitated lithium is directly contacted with the solid electrolyte to degenerate the solid electrolyte and form a dendrite, thereby reducing the charge/discharge capacity of the all solid cell and shortening the lifespan of the all solid cell.

However, the anode for the all solid cell fabricated by an exemplary fabrication method of the anode for the all solid cell according to an exemplary embodiment of the present invention may include the conductive coating layer, thereby suppressing generation of lithium in the anode by preventing direct electrical contact between the conductive material and the solid electrolyte. Accordingly, the charge/discharge capacity of the all solid cell may increase and the lifespan of the all solid cell may increase.

Hereinafter, the present invention will be described in more detail through detailed Examples. The following Examples are just exemplified for helping understanding the present invention and the scope of the present invention is not limited thereto.

EXAMPLES

The following examples illustrate the invention and are not intended to limit the same.

Measurement of Capacity according to wt % of Coating Material

Figure 5A:
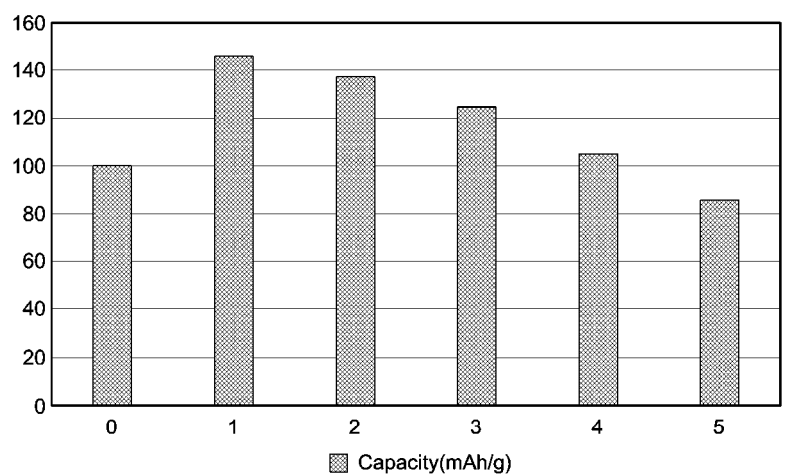
FIG. 5A is a graph illustrating capacity measurement values according to a weight % of an exemplary coating material.

Vapor grown carbon fiber (VGCF) was used as a conductive material and 0, 1, 2, 3, 4, and 5 wt % of $B_2O_3$ based on the conductive material were provided, respectively, and heat-treated at a temperature of about 300° C. to form a conductive coating layer. The all solid cell was formed by using nickel as an anode current collector, graphite as an anode active material, $Li_6PS_5Cl$ as a solid electrolyte layer, and $LiNi_{0.6}Mn_{0.2}Co_{0.2}O_2$ as a cathode to measure the capacity, as illustrated in FIG. 5A. As shown in FIG. 5A, the all solid cell had a high capacity value when 1 to 3 wt % of $B_2O_3$ based on the conductive material was included.

Measurement of Capacity according to Heat Treatment Temperature

Figure 5B:
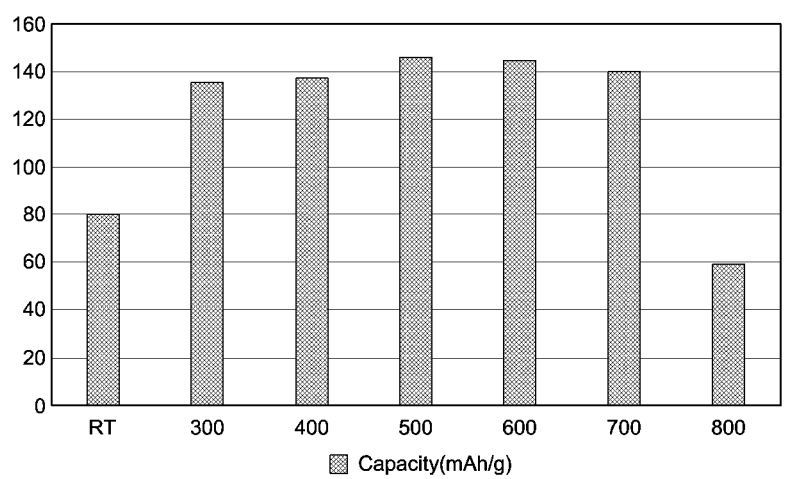
FIG. 5B is a graph illustrating capacity measurement values according to an exemplary heat treatment temperature.

VGCF was used as the conductive material and 1 wt % of $B_2O_3$ based on the conductive material was provided and then heat-treated at a temperature of 300, 400, 500, 600, 700, and 800° C., respectively, to form a conductive coating layer. The all solid cell was formed by using nickel as an anode current collector, graphite as an anode active material, $Li_6PS_5Cl$ as a solid electrolyte layer, and $LiNi_{0.6}Mn_{0.2}Co_{0.2}O_2$ as a cathode to measure the capacity. The result was illustrated in FIG. 5B, and the all solid cell had a high capacity value when heat-treated at a temperature of 300 to 700° C.

Example 1

Vapor grown carbon fiber (VGCF) was used as the conductive material and 1 wt % of $P_2O_5$ based on the conductive material was provided and then heat-treated at a temperature of 300° C. to form a conductive coating layer. The all solid cell was formed by using nickel as an anode current collector, graphite as an anode active material, $Li_6PS_5Cl$ as a solid electrolyte layer, and $LiNi_{0.6}Mn_{0.2}Co_{0.2}O_2$ as a cathode.

Example 2

An all solid cell was formed in the same manner as Example 1 except for using $B_2O_3$ instead of $P_2O_5$.

Example 3

An all solid cell was formed in the same manner as Example 1 except for using $SiO_2$ instead of $P_2O_5$.

Comparative Example 1

An all solid cell was formed in the same manner as Example 1 except that a separate conductive coating layer is not formed.

Evaluation of Properties

1. Comparison of Discharge Capacity

Figure 5C:
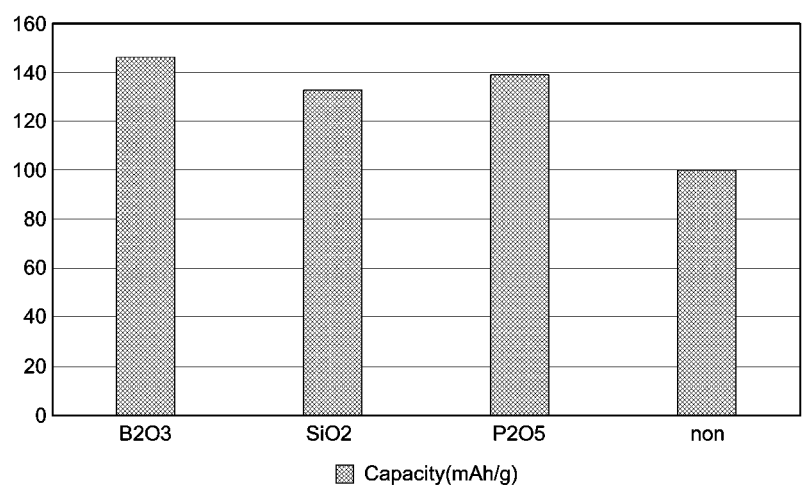
FIG. 5C is a graph illustrating capacity measurement values in Examples 1 to 3 and Comparative Example 1.

FIG. 5C is a graph illustrating capacity measurement values in Examples 1 to 3 and Comparative Example 1. As shown in FIG. 5C, the all solid cells in Examples 1 to 3 had higher capacity values than that of Comparative Example 1 to have excellent discharge capacities.

2. Measurement of Change in Current

Figure 5D:
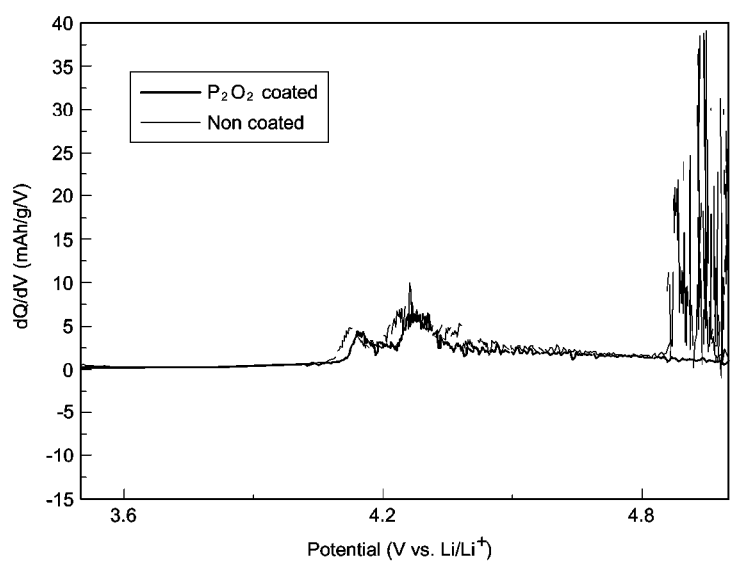
FIG. 5D is a graph obtained by measuring a change in current by providing voltages to Example 1 and Comparative Example 1, respectively.

A voltage was provided to each all solid cell of Example 1 and Comparative Example 1, and a change in current was measured as illustrated in FIG. 5D. As shown in FIG. 5D, only the all solid cell in Comparative Example 1 showed an unstable graph at a marked portion, when lithium was precipitated on the surface of the conductive material during the charging of the all solid cell.

3. Measurement of Capacity according to the Number of Times of Charge/Discharge

Figure 5E:
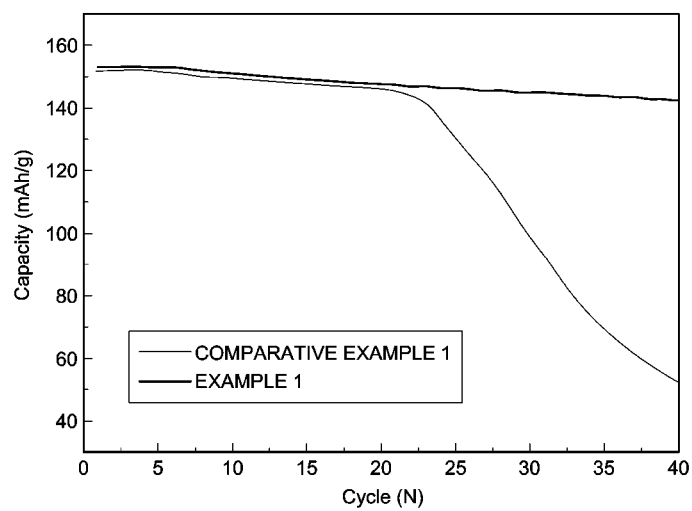
FIG. 5E is a graph illustrating a relationship between the number of times of charge/discharge and a capacity in Example 1 and Comparative Example 1, respectively.

FIG. 5E is a graph illustrating a relationship between the number of times of charge/discharge and a capacity in Example 1 and Comparative Example 1, respectively. As shown in FIG. 5E, in Comparative Example 1, the capacity value decreased as the number of times of charge/discharge increased, but the capacity was maintained even if the number of times of charge/discharge was increased in Example 1.

Figure 5F:
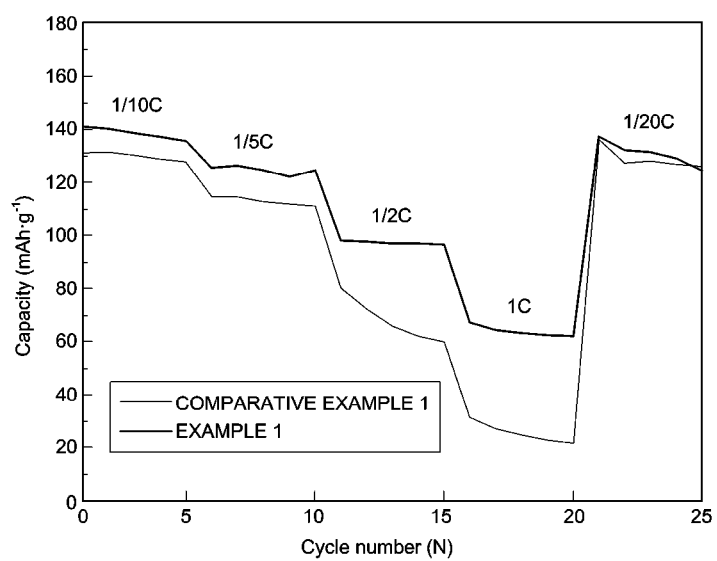
FIG. 5F is a graph illustrating a relationship between the number of times of charge/discharge and a capacity according to charge/discharge conditions in Example 1 and Comparative Example 1, respectively.

FIG. 5F is a graph illustrating a relationship between the number of times of charge/discharge and a capacity according to charge and discharge conditions in Example 1 and Comparative Example 1, respectively. As shown in FIG. 5F, in Example 1, the capacity value according to the number of times of charge/discharge was greater than that of Comparative Example 1 under different charge and discharge conditions.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An anode for an all solid cell, comprising:
   an anode current collector;
   a conductive material of which one end contacts a part of the anode current collector;
   a conductive coating layer surrounding the conductive material;
   an anode active material which contacts the other end of the conductive material; and
   a solid electrolyte,
   wherein the conductive coating layer prevents the conductive material and the solid electrolyte from being electrically connected to each other,
   wherein the conductive material is a carbon compound having a needle-like shape and comprises a long axis and a short axis on a cross section,
   the conductive material contacts the anode current collector at one end of the long axis and contacts the anode active material at the other end of the ion axis, and
   the conductive coating layer surrounds a surface of the long axis of the conductive material.

2. The anode of claim 1, wherein the conductive coating layer comprises one or more nonconductive oxides.

3. The anode of claim 1, wherein the conductive coating layer comprises at least one of $P_2O_5$, $B_2O_3$, and $SiO_2$.

4. An all-solid cell comprising an anode of claim 1.

5. A vehicle comprising an all-solid cell of claim 4.

* * * * *